United States Patent
Wu et al.

(10) Patent No.: US 11,546,837 B2
(45) Date of Patent: Jan. 3, 2023

(54) METHOD OF INDICATING SYSTEM INFORMATION TYPE, NETWORK DEVICE AND USER EQUIPMENT

(71) Applicant: VIVO MOBILE COMMUNICATION CO., LTD., Chang'an Dongguan (CN)

(72) Inventors: Kai Wu, Chang'an Dongguan (CN); Jingzhi Ma, Chang'an Dongguan (CN); Zichao Ji, Chang'an Dongguan (CN); Wei Bao, Chang'an Dongguan (CN); Siqi Liu, Chang'an Dongguan (CN); Yu Ding, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 283 days.

(21) Appl. No.: 16/765,110

(22) PCT Filed: Oct. 11, 2018

(86) PCT No.: PCT/CN2018/109814
§ 371 (c)(1),
(2) Date: May 18, 2020

(87) PCT Pub. No.: WO2019/095902
PCT Pub. Date: May 23, 2019

(65) Prior Publication Data
US 2020/0351760 A1 Nov. 5, 2020

(30) Foreign Application Priority Data
Nov. 17, 2017 (CN) .......................... 201711148760.7

(51) Int. Cl.
*H04W 48/12* (2009.01)
*H04W 72/04* (2009.01)

(52) U.S. Cl.
CPC .......... *H04W 48/12* (2013.01); *H04W 72/042* (2013.01)

(58) Field of Classification Search
CPC ........ H04W 48/12; H04W 72/042; H04L 1/00
See application file for complete search history.

(56) References Cited

U.S. PATENT DOCUMENTS

| | | |
|---|---|---|
| 2013/0343323 A1 | 12/2013 | Kang et al. |
| 2015/0312936 A1 | 10/2015 | Nguyen et al. |
| 2016/0286506 A1 | 9/2016 | Chae et al. |
| 2017/0135080 A1 | 5/2017 | Xia et al. |
| 2017/0150424 A1* | 5/2017 | Lee .................. H04W 72/0413 |

FOREIGN PATENT DOCUMENTS

| | | |
|---|---|---|
| CN | 101594286 A | 12/2009 |
| CN | 105337684 A | 2/2016 |
| WO | 2017026806 A1 | 2/2017 |

OTHER PUBLICATIONS

International Search Report & Written Opinion related to Application No. PCTICN2018/109814; dated Jan. 4, 2019.
Chinese First Office Action Application No. 201711148760.7; dated Mar. 16, 2020.

* cited by examiner

*Primary Examiner* — Kyaw Z Soe
(74) *Attorney, Agent, or Firm* — von Briesen & Roper, s.c.

(57) ABSTRACT

A method of indicating a system information type, a network device and a user equipment are provided. The method includes: determining indication information configured to indicate a System Information (SI) type; sending, to a user equipment, a Physical Downlink Control Channel (PDCCH) carrying the indication information.

20 Claims, 3 Drawing Sheets

METHOD OF INDICATING SYSTEM INFORMATION TYPE, NETWORK DEVICE AND USER EQUIPMENT

CROSS REFERENCE OF RELATED APPLICATION

This application is the U.S. national phase of PCT Application No. PCT/CN2018/109814 filed on Oct. 11, 2018, which claims a priority to Chinese Patent Application No. 201711148760.7 filed on Nov. 17, 2017, which is incorporated herein by reference in its entirety.

TECHNICAL FIELD

The present disclosure relates to the field of communications, and in particular, to a method of indicating a system information type, a network device and a user equipment.

BACKGROUND

In a New Radio (NR), system information includes a master system information block (MIB), remaining minimum system information (RMSI) and other system information (OSI).

In a Long Term Evolution (LTE) system, network devices combine different System Information Blocks (SIBs) into System Information messages (SI messages) and select an appropriate time-frequency location within the transmission window corresponding to the system information to broadcast the SI messages. The system information may be divided into various SI types according to the purpose and content.

RMSI and OSI schedule a physical downlink shared channel (PDSCH) for transmission through a Physical Downlink Control Channel (PDCCH).

In the NR, the SI PDCCH monitoring window transmitting OSI CORESET may overlap with the SI PDCCH monitoring window transmitting RMSI CORESET, then there may be OSI CORESET transmission within the SI PDCCH monitoring window transmitting RMSI CORESET, and NR may not prohibit the transmission of other OSI CORESET at the moment of RMSI CORESET transmission.

OSI CORESET corresponding to different OSIs will be transmitted in multiple different SI PDCCH monitoring windows. There may also be overlaps between different OSIs. In the SI PDCCH monitoring window transmitting some OSI, there may be other transmission of OSI CORESET.

In the NR, since only one system information radio network temporary identity (SI-RNTI) is defined in one cell, when the receiving windows of RMSI overlapping with that of different OSIs, a certain slot may be located in multiple SI PDCCH monitoring windows at the same time, the user equipment (UE) at the physical layer cannot distinguish whether the received system information is RMSI or OSI, or which SI message in the OSI.

SUMMARY

In a first aspect, a method of indicating a system information type, applied to a network device is provided in the present disclosure, including:
determining indication information configured to indicate a System Information (SI) type;
sending, to a user equipment, a Physical Downlink Control Channel (PDCCH) carrying the indication information In a second aspect, a method of indicating a system information type, applied to a user equipment is provided in the present disclosure, including:
receiving a Physical Downlink Control Channel (PDCCH) sent by a network device, where the PDCCH carries indication information configured to indicate a System Information (SI) type;
determining the SI type according to the indication information.

In a third aspect, a network device is provided in the present disclosure, including:
a determining module, configured to determine indication information configured to indicate a System Information (SI) type;
a sending module, configured to send, to a user equipment, a Physical Downlink Control Channel (PDCCH) carrying the indication information.

In a fourth aspect, a user equipment is provided in the present disclosure, including:
a receiving module, configured to receive a Physical Downlink Control Channel (PDCCH) sent by a network device, where the PDCCH carries indication information configured to indicate a System Information (SI) type;
a type determining module, configured to determine the SI type according to the indication information.

In a fifth aspect, a network device is provided in the present disclosure, including: a memory, a processor and a computer program stored in the memory and executable by the processor, where the computer program is executed by the processor to perform the method of indicating the system information type in the first aspect.

In a sixth aspect, a computer-readable storage medium storing a computer program is provided in the present disclosure, where the computer program is executed by a processor to perform the method of indicating the system information type in the first aspect.

In a seventh aspect, a user equipment is provided in the present disclosure, including: a memory, a processor and a computer program stored in the memory and executable by the processor, where the computer program is executed by the processor to perform the method of indicating the system information type in the second aspect.

In an eighth aspect, a computer-readable storage medium storing a computer program is provided in the present disclosure, where the computer program is executed by a processor to perform the method of indicating the system information type in the second aspect.

BRIEF DESCRIPTION OF THE DRAWINGS

The drawings described herein are configured to provide a further understanding of the present disclosure and constitute a part of the present disclosure. The schematic embodiments of the present disclosure and their descriptions are configured to explain the present disclosure and do not constitute an undue limitation on the present disclosure.

DETAILED DESCRIPTION

The technical solutions in the embodiments of the present disclosure will be described clearly and completely in conjunction with the drawings in the embodiments of the present disclosure. Obviously, the described embodiments are part of the embodiments of the present disclosure, but not all of the embodiments. Based on the embodiments of the present disclosure, all other embodiments obtained by a person of ordinary skill in the art without creative work fall within the protection scope of the present disclosure.

The embodiments of the present disclosure can be applied to various communication systems, such as: Global System of Mobile Communication (GSM) system, Code Division Multiple Access (CDMA) system, Wideband Code Division Multiple Access (WCDMA) system, General Packet Radio Service (GPRS) system, Long Term Evolution (LTE)/Long Term Evolution advanced (LTE-A) system, New Radio (NR) system, etc.

User equipment (UE), also known as Mobile Terminal, mobile user equipment, etc., can communicate with one or more core networks via a radio access network (e.g., RAN, Radio Access Network), The user equipment may be a mobile terminal, such as a mobile phone (or called a "cellular" phone) and a computer with a mobile terminal, for example, it may be a portable, pocket-sized, handheld, built-in computer or vehicle-mounted mobile device, and exchange language and/or data with the radio access network.

The base station can be a Base Transceiver Station (BTS) in GSM or CDMA, or a base station (NodeB) in WCDMA, or an evolutional NodeB (eNB or e-NodeB,) in LTE and gNB in 5G, which is not limited in the present disclosure, but for the convenience of description, the following embodiment uses gNB as an example for description.

The embodiments of the present disclosure will be described in detail below with reference to the drawings.

Figure 1:
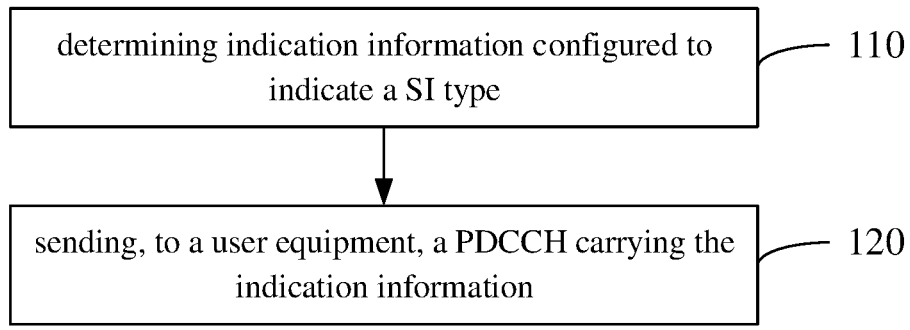
FIG. 1 is a flowchart of a method of indicating a system information type in an embodiment of the present disclosure.

FIG. 1 is a flowchart of a method of indicating a system information type in an embodiment of the present disclosure. As shown in FIG. 1, this method is applied to a network-side device. The method may include:

Step 110: determining indication information configured to indicate a System Information (SI) type;

Step 120: sending, to a user equipment, a Physical Downlink Control Channel (PDCCH) carrying the indication information.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

Optionally, in an embodiment of the present disclosure, different cyclic shifts may be defined for different RMSIs and OSIs. Before using the SI-RNTI to scramble the CRC bits of the PDCCH, a corresponding cyclic shift may be performed on SI-RNTI based on the SI type. Different types of system information are indicated by different cyclic shifts. Specifically, Step 110 may further include:

determining, according to the SI type, a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH;

determining the quantity of cyclic-shifted bits as the indication information.

Optionally, in this embodiment, only for the SI transmitted through the overlapping SI PDCCH monitoring windows, the CRC bits is scrambled through different quantities of cyclic-shifted bits corresponding to the SI-RNTI. The quantity of cyclic-shifted bits corresponding to different SI types may be defined in advance. This embodiment is not limited to a pre-defined manner, and this manner does not affect the implementation of this embodiment.

When scrambling the CRC bits, the SI-RNTI may be cyclically shifted according to the quantity of cyclic-shifted bits. The cyclically shifted SI-RNTI may scramble the CRC bits.

It can be known that the quantity of cyclic-shifted bits has a corresponding relationship with the SI type, which is equivalent to the different quantity of cyclic-shifted bits that can uniquely determine the type of corresponding SI. Accordingly, it is able to enable the user equipment to determine which one of RMSI and OSI is the SI being at the physical layer, or which system information in OSI causes the ambiguity between RMSI and OSI and between OSI information.

Optionally, in another embodiment, different CRC masks may be defined for different RMSI and OSI, that is, in addition to scrambling the CRC bits of the PDCCH by using SI-RNTI, the different corresponding CRC mask may be used to indicate different SI types. Specifically, Step 110 may include:

determining a CRC mask to scramble CRC bits scrambled by a SI-RNTI in the PDCCH, according to the SI type;

determining the CRC mask as the indication information.

Optionally, different CRC masks can be used only for SI PDCCHs transmitted corresponding to overlapping SI PDCCH monitoring windows. The CRC masks corresponding to different SI types may be pre-defined. It can be known that such pre-defined manner defines the association relationship between the CRC mask and the SI type, and this association relationship is unique, that is, a single CRC mask is only configured to define one SI type.

Optionally, in another embodiment, a Hybrid Automatic Repeat Request (HARQ) process number field in DCI information may be configured to determine different SI types. Specifically, Step 110 may include:

determining a value of a HARQ process number field in Downlink Control Information (DCI) in the PDCCH, according to the SI type;

determining the value of the HARQ process number field as the indication information.

Optionally, different HARQ process number fields may be used for the SI PDCCHs transmitted through overlapping SI PDCCH monitoring windows to distinguish different SI types. Correspondingly, the HARQ process number field corresponding to different SI types may be defined or set in advance.

Optionally, in another embodiment, a system information index (SI index) may be directly transmitted in the DCI information, and different SI types are indicated through the SI index. Specifically, Step 110 may include:

determining a system information index corresponding to the SI type, according to the SI type;

determining the system information index as the indication information.

Optionally, the SI index may be carried in the DCI in the PDCCH. In this embodiment, the SI index may be carried in reserved fields or unused fields in DCI.

It should be noted that the reserved field in the DCI refers to a field that has not been defined for a specific function, and the unused field refers to a field that has been defined for a specific function but is not used when scheduling system information.

The unused fields here may include: Transmission Power Control (TPC) field, Downlink Assignment Index (DAI), Uplink Transmission Resource Indication field, and Aperiodic SRS Indication field, Aperiodic CSI-RS indication field, codebook group number (CBG) indication field, physical resource block bundling size (PRB bundling size) indication field, etc.

For example, different SI indexes may be used only for SI PDCCH transmitted through overlapping SI PDCCH monitoring windows to distinguish different SI types. Here, the SI index corresponding to the different SI types may be preset.

It can be understood that when the SI is scheduled by the PDCCH, some fields in the DCI carried by the PDCCH may be highly compressed, resulting in that only a few fields are in the DCI, such as Scheduling Coding Scheme (SCS) and PRB indication and other information, there are no redundant fields available. In this case, a cyclic shift number of bits or a CRC mask may be used to indicate the different SI types. Here, it can also be understood that in this embodiment, the quantity of cyclic-shifted bits, the CRC mask, the HARQ process number field and the system information index may be set at the same time to indicate the different SI types, In specific use, an appropriate scheme is adopted to distinguish and determine different SI types.

Figure 2:
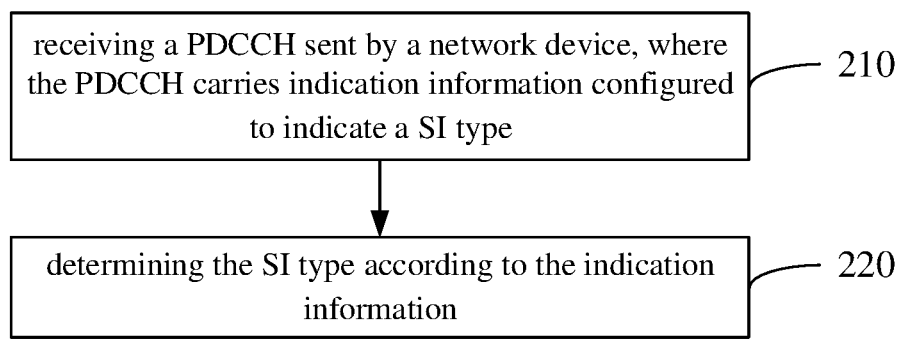
FIG. 2 is a flowchart of a method for indicating a system information type in another embodiment of the present disclosure.

FIG. 2 is a flowchart of a method for indicating a system information type in another embodiment of the present disclosure. As shown in FIG. 2, the method is applied to the terminal side, and the method may include:

Step 210: receiving a Physical Downlink Control Channel (PDCCH) sent by a network device, where the PDCCH carries indication information configured to indicate a System Information (SI) type;

Step 220: determining the SI type according to the indication information.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

Optionally, in an embodiment, the indication information may be a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH. Step 220 may include: determining the SI type according to the quantity of cyclic-shifted bits and a correspondence between the SI type and the quantity of cyclic-shifted bits.

The correspondence between the quantity of cyclic-shifted bits and SI type may be preset, and the user equipment may specifically determine SI type according to the correspondence between the quantity of cyclic-shifted bits and SI type.

Optionally, in another embodiment, the indication information is a CRC mask to scramble CRC bits scrambled by a SI-RNTI in the PDCCH. Step 220 may include: determining the SI type according to the CRC mask and a correspondence between the CRC mask and the SI type.

The user equipment may determine, after receiving a PDCCH, the corresponding SI type according to the CRC mask in the PDCCH, based on the preset correspondence between the CRC mask and the SI type.

Optionally, in another embodiment, the indication information is a value of a HARQ process number field in Downlink Control Information (DCI) in the PDCCH. Step 220 may include: determining the SI type according to the value of the HARQ process number field and a correspondence between the value of the HARQ process number field and the SI type.

The user equipment may determine SI type according to the preset correspondence between the value of the HARQ process number field and the SI type, and after receiving the PDCCH, the SI type is determined according to the value of the HARQ process number field.

Optionally, in another embodiment, the indication information is a system information index. Step 220 may include: determining a type indicated by the system information index as the SI type.

It should be noted that the system information index may be carried in the DCI in the PDCCH. Specifically, the system information index may be carried in the reserved field or unused field in the DCI.

The user equipment may determine the corresponding SI type according to the system information index after receiving the PDCCH according to the preset correspondence between the SI index and the SI type.

The embodiments of the present disclosure may be further described in combination with network devices and user equipment.

Optionally, the SI type is determined according to the quantity of cyclic-shifted bits as described hereinabove, it is assumed that a certain slot position belongs to the SI PDCCH monitoring window transmitting RMSI CORESET and OSI CORESET at the same time, or belongs to several SI PDCCH monitoring window transmitting SI message1 . . . SI message n of OSI CORESET. When the network equipment transmits the SI corresponding to the RMSI and OSI, it is able use different cyclic-shifted bits to cyclically shift the SI-RNTI, and then use the cyclic shifted SI-RNTI to scramble the CRC bits in the PDCCH. For example, for the PDCCH corresponding to the first SI, the CRC bits may be scrambled using the SI-RNTI subjected to the bits cyclic shift. For the PDCCH corresponding to other n SIs, the CRC bits may be scrambled using the SI-RNTI subjected to the bits cyclic shift.

If the PDCCH corresponding to the SI may only be transmitted in one corresponding SI PDCCH monitoring window, the corresponding quantity of cyclic-shifted bits may be described as using different cyclic shift values for different SI PDCCH monitoring windows. Optionally, the CRC bits of the PDCCH may be generated in the following manner:

$$c_k = (b_k + cs(x_{rnti,k}, M_n)) \bmod 2 \text{ for } k=1,2,\ldots,L.$$

L represents the bit length of SI-RNTI, bk represents the scrambled CRC bits, k represents the SI-RNTI bit sequence, and cs $(x_{rnti,k}, M_n)$ represents a $M_n$ bit cyclic shift of the SI-RNTI sequence. Here, it should be noted that SI-RNTI may only scramble a part of CRC bits, that is, the number of bits of SI-RNTI is less than the number of CRC bits, for example, SI-RNTI may only scramble the last L CRC bits of the CRC bit sequence.

After the UE receives the PDCCH, the UE will check the CRC bits after decoding the CRC bits. In this embodiment, the UE may use multiple SI-RNTIs subjected to the cyclic shifts through different cyclic-shifted bits to check the CRC bits. If a certain CRC check is passed, the UE may determine the corresponding SI type through the number of corresponding cyclic-shifted bits used in the CRC bit check.

Optionally, the SI type is determined based on the CRC mask as described hereinabove, it is assumed that a certain slot position belongs to the SI PDCCH monitoring window transmitting RMSI CORESET and OSI CORESET, or belongs to the SI PDCCH monitoring window transmitting SI message1, . . . , of SI message n of several different OSI CORESET. When the network device transmits the SI corresponding to the RMSI and OSI, on the basis of using the SI-RNTI to scramble the CRC bits in the PDCCH, different CRC masks may be used to further scramble the CRC bits. For example, the CRC bits of the PDCCH corresponding to the first SI may be scrambled using the first CRC mask, and the CRC bits of the PDCCH corresponding to the $n^{th}$ SI may be scrambled using the $n^{th}$ CRC mask. Here, all CRC masks are different.

If the PDCCH corresponding to a certain SI can only be transmitted in a certain SI PDCCH monitoring window, the CRC mask may be described as using different CRC masks for different SI PDCCH monitoring windows. The PDCCH CRC is generated as follows:

$$c_k = (b_k + x_{rnti,k} + x_k^{mask,n}) \bmod 2 \text{ for } k=1,2,\ldots,L-1.$$

L represents the length of SI-RNTI bit, $b_k$ represents the scrambled CRC bits, $x_{rnti,\ k}$ represents the sequence of SI-RNTI bits, and $x_k^{mask,n}$ represents the CRC mask corresponding to the $n_{th}$ SI. Here, the SI-RNTI may scramble only part of the CRC bits, that is, the number of bits of the SI-RNTI is smaller than the number of CRC bits. For example, SI-RNTI scrambles the last L CRC bits of the CRC bit sequence.

After receiving the PDCCH, the UE checks the CRC bits after decoding the CRC bits. The UE may use multiple different CRC masks to check the CRC bits. If a certain check is passed, the corresponding SI type may be determined according to the corresponding CRC mask used in the CRC bit check process.

Optionally, the SI type is determined based on the a value of HARQ process number field in DCI as described hereinabove, it is assumed that a certain slot position belongs to the SI PDCCH monitoring window transmitting RMSI CORESET and OSI CORESET, or belongs to the SI PDCCH monitoring window transmitting SI message1, . . . , of SI message n of several different OSI CORESET. When the network device transmits the SI corresponding to the RMSI and OSI. The HARQ process number field in the hybrid automatic retransmission in the DCI transmitted by the PDCCH may be marked with different values, and different SI types may be determined by the different values in the HARQ process number field type.

If the PDCCH corresponding to the SI will only be transmitted in a certain SI PDCCH monitoring window, it can be described as setting different values in the HARQ process number field of the hybrid automatic retransmission for different SI PDCCH monitoring windows.

After receiving the PDCCH, the UE parses out the HARQ process number field in the DCI content, and determines the corresponding SI type according to the value in the HARQ process number field.

Optionally, when the system information index is configured to determine the SI type as described hereinabove, it is assumed that a certain Slot position belongs to both the SI PDCCH monitoring window transmitting RMSI CORESET and OSI CORESET, or belongs to the SI PDCCH monitoring window transmitting SI message1, . . . , of SI message n of several different OSI CORESET. When the network equipment transmits the SI corresponding to the RMSI and OSI, it can use the DCI information transmission system information index, or repeatedly use the following resource fields in the PDCCH: uplink transmission power control TPC, DAI, uplink transmission resource indication, Aperiodic SRS indication, Acyclic CSI-RS indication, CBG number indication, PRB bundling size indication and other fields in DCI.

If the PDCCH corresponding to the SI can only be transmitted in a corresponding SI PDCCH monitoring window, it can also be described as using different system information indexes for different SI PDCCH monitoring windows.

After receiving the PDCCH, the UE may parse out the above resource fields reused in the DCI content, and the SI type may be determined according to the system information index in the parsed resource fields.

Figure 3:
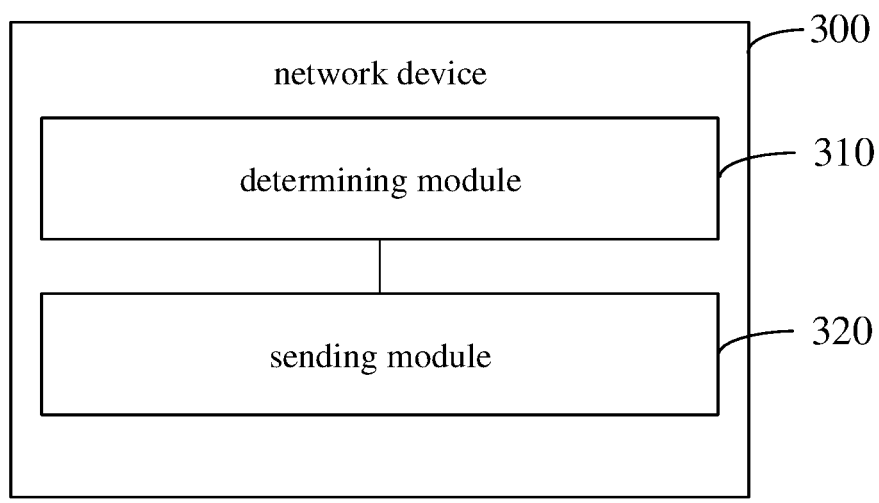
FIG. 3 is a structural diagram of a network device in an embodiment of the present disclosure.

FIG. 3 is a structural diagram of a network device in an embodiment of the present disclosure. As shown in FIG. 3, the network device 300 includes:

a determining module 310, configured to determine indication information configured to indicate a System Information (SI) type;

a sending module 320, configured to send, to a user equipment, a Physical Downlink Control Channel (PDCCH) carrying the indication information.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

Optionally, the determining module 310 is configured to:
determine, according to the SI type, a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH;
determine the quantity of cyclic-shifted bits as the indication information.

Optionally, the determining module 310 is configured to:
determine a CRC mask to scramble CRC bits scrambled by a SI-RNTI in the PDCCH, according to the SI type;
determine the CRC mask as the indication information.

Optionally, the determining module 310 is configured to:
determine a value of a Hybrid Automatic Repeat Request (HARQ) process number field in Downlink Control Information (DCI) in the PDCCH, according to the SI type;
determine the value of the HARQ process number field as the indication information.

Optionally, the determining module 310 is configured to:
determine a system information index corresponding to the SI type, according to the SI type;

determine the system information index as the indication information.

Optionally, the system information index is carried in DCI in the PDCCH.

Optionally, the system information index is carried in a reserved field or an unused field in the DCI.

Figure 4:
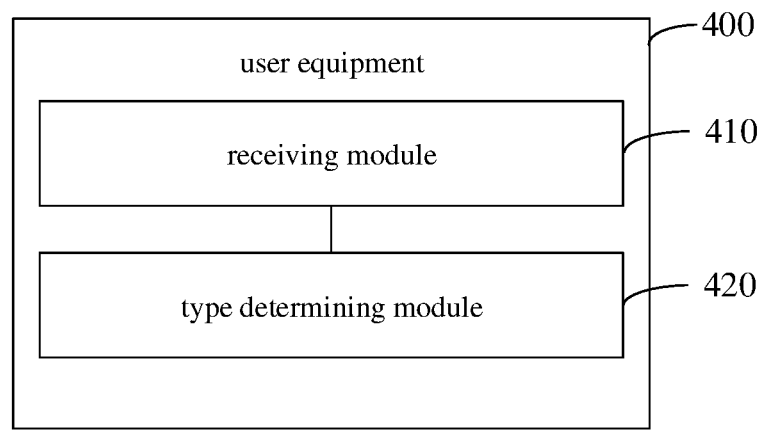
FIG. 4 is a structural diagram of a user equipment in an embodiment of the present disclosure.

FIG. 4 is a structural diagram of a user equipment in an embodiment of the present disclosure. As shown in FIG. 4, the user equipment 400 includes:

a receiving module 410, configured to receive a Physical Downlink Control Channel (PDCCH) sent by a network device, where the PDCCH carries indication information configured to indicate a System Information (SI) type;

a type determining module 420, configured to determine the SI type according to the indication information.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

Optionally, the indication information is a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH; where the type determining module 420 is configured to: determine the SI type according to the quantity of cyclic-shifted bits and a correspondence between the SI type and the quantity of cyclic-shifted bits.

Optionally, the indication information is a CRC mask to scramble CRC bits scrambled by a SI-RNTI in the PDCCH; where the type determining module 420 is configured to: determine the SI type according to the CRC mask and a correspondence between the CRC mask and the SI type.

Optionally, the indication information is a value of a Hybrid Automatic Repeat Request (HARQ) process number field in Downlink Control Information (DCI) in the PDCCH; where the type determining module 420 is configured to: determine the SI type according to the value of the HARQ process number field and a correspondence between the value of the HARQ process number field and the SI type.

Optionally, the indication information is a system information index; where the type determining module 420 is configured to: determine a type indicated by the system information index as the SI type.

Optionally, the system information index is carried in DCI in the PDCCH.

Optionally, the system information index is carried in a reserved field or an unused field in the DCI.

Figure 5:
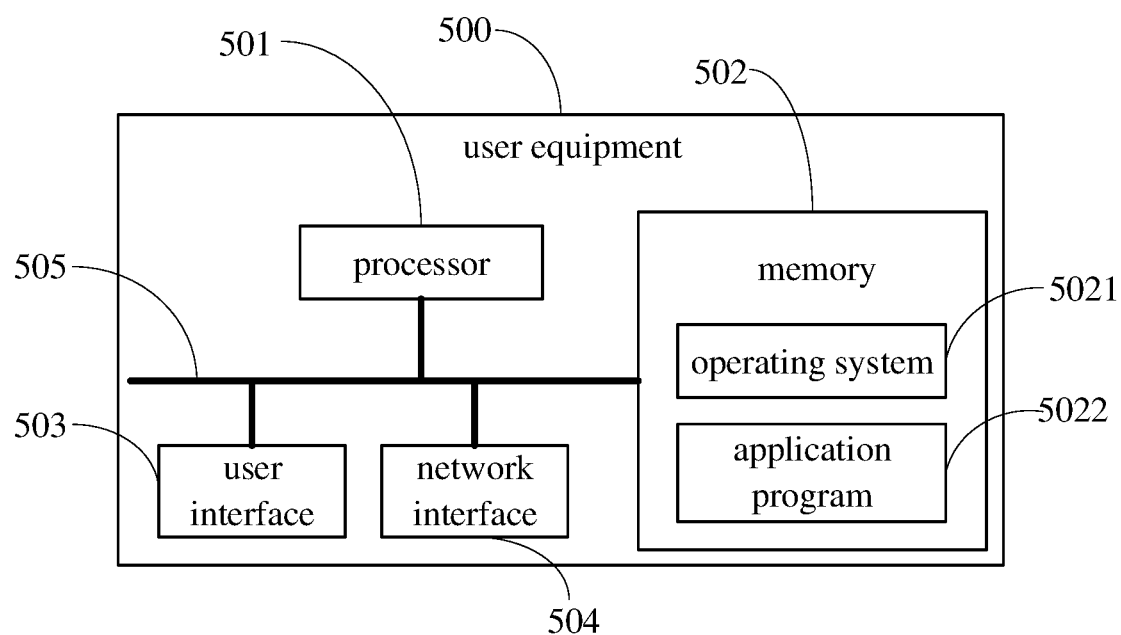
FIG. 5 is a block diagram of a user equipment in another embodiment of the present disclosure.

FIG. 5 is a block diagram of a user equipment in another embodiment of the present disclosure. The user equipment 500 shown in FIG. 5 includes: at least one processor 501, memory 502, at least one network interface 504, and user interface 503. The various components in the user equipment 500 are coupled together via a bus system 505. Understandably, the bus system 505 is configured to implement connection and communication between these components. In addition to the data bus, the bus system 505 also includes a power bus, a control bus, and a status signal bus. However, for clarity, various buses are marked as the bus system 505 in FIG. 5.

The user interface 503 may include a display, a keyboard, or a pointing device (for example, a mouse, a trackball, a touch pad, or a touch screen, etc.).

It can be understood that the memory 502 in the embodiment of the present disclosure may be a volatile memory or a nonvolatile memory, or may include both volatile and nonvolatile memory. Among them, the non-volatile memory can be read-only memory (ROM), programmable read-only memory (PROM), erasable programmable read-only memory (EPROM), Electronically Erasable Programmable Read Only Memory (EEPROM) or flash memory. The volatile memory may be a random access memory (RAM), which is used as an external cache. By way of example but not limitation, many forms of RAM are available, such as static random access memory (SRAM), dynamic random access memory (DRAM), synchronous dynamic random access memory (SDRAM), Double Data Rate Synchronous Dynamic Random Access Memory (DDRSDRAM), Enhanced Synchronous Dynamic Random Access Memory (ESDRAM), Synchronous Linked Dynamic Random Access Memory (SLDRAM) and Direct memory bus random access memory (DRRAM). The memory 502 of the system and method described in the embodiments of the present disclosure is intended to include but is not limited to these and any other suitable types of memory.

In some embodiments, the memory 502 stores the following elements, executable modules or data structures, or their subsets, or their extended sets: operating system 5021 and application programs 5022.

Among them, the operating system 5021 includes various system programs, such as a framework layer, a core library layer, a driver layer, etc., for implementing various basic services and processing hardware-based tasks. The application program 5022 includes various application programs, such as a media player (Media Player), a browser (Browser), etc., for implementing various application services. The program for implementing the method of the embodiment of the present disclosure may be included in the application program 5022.

In the embodiment of the present disclosure, the user equipment 500 further includes: a computer program stored on the memory 502 and executable on the processor 501. When the computer program is executed by the processor 501, the following steps are implemented: receiving a Physical Downlink Control Channel (PDCCH) sent by a network device, where the PDCCH carries indication information configured to indicate a System Information (SI) type;

determining the SI type according to the indication information.

The method disclosed in the foregoing embodiments of the present disclosure may be applied to the processor 501, or implemented by the processor 501. The processor 501 may be an integrated circuit chip with signal processing capabilities. In the implementation process, each step of the above method may be completed by an integrated logic circuit of hardware in the processor 501 or an instruction in the form of software. The aforementioned processor 501 may be a general-purpose processor, a digital signal processor (DSP), an application specific integrated circuit (ASIC), an FPGA, or other programmable Logic devices, discrete gates or transistor logic devices, discrete hardware components. The disclosed methods, steps, and logical block diagrams in the embodiments of the present disclosure may be implemented or executed. The general-purpose processor may be a microprocessor or the processor may be any conventional processor or the like. The steps of the method disclosed in conjunction with the embodiments of the present disclosure may be directly embodied and executed by a hardware decoding processor, or may be executed and completed by a combination of hardware and software modules in the decoding processor. The software module may be located in a computer-readable storage medium that is mature in the art, such as random access memory, flash memory, read-only memory, programmable read-only memory, or electrically erasable programmable memory, and registers. The computer-readable storage medium is located in the memory 502, and the processor 501 reads the information in the memory 502 and completes the steps of the above method in combination with its hardware. Specifically, a computer program is stored on the computer-readable storage medium, and when the computer program is executed by the processor 501, each step of the embodiment of the method for indicating a system information type described above is implemented.

It can be understood that the embodiments described in the embodiments of the present disclosure may be implemented by hardware, software, firmware, middleware, microcode, or a combination thereof. For hardware implementation, the processing unit can be implemented in one or more application specific integrated circuits (ASICs), digital signal processors (DSPs), digital signal processing devices (DSP devices), Programmable Logic Device (PLD), Field-Programmable Gate Array (FPGA), general-purpose processor, controller, microcontroller, microprocessor, other electronic unit for performing the functions of the present disclosure Or a combination thereof.

For software implementation, the technology described in the embodiments of the present disclosure may be implemented through modules (e.g., processes, functions, etc.) that perform the functions described in the embodiments of the present disclosure. The software codes can be stored in the memory and executed by the processor. The memory may be implemented in the processor or external to the processor.

Optionally, the indication information is a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH;

the computer program is executed by the processor 501 to perform:

the determining the SI type according to the indication information includes:

determining the SI type according to the quantity of cyclic-shifted bits and a correspondence between the SI type and the quantity of cyclic-shifted bits.

Optionally, the indication information is a CRC mask to scramble CRC bits scrambled by a SI-RNTI in the PDCCH;

the computer program is executed by the processor 501 to perform:

determining the SI type according to the CRC mask and a correspondence between the CRC mask and the SI type.

Optionally, the indication information is a value of a Hybrid Automatic Repeat Request (HARQ) process number field in Downlink Control Information (DCI) in the PDCCH;

the computer program is executed by the processor 501 to perform:

determining the SI type according to the value of the HARQ process number field and a correspondence between the value of the HARQ process number field and the SI type.

Optionally, the indication information is a system information index;

the computer program is executed by the processor 501 to perform:

determining a type indicated by the system information index as the SI type.

Optionally, the system information index is carried in DCI in the PDCCH.

Optionally, the system information index is carried in a reserved field or an unused field in the DCI.

The user equipment 500 may implement various processes implemented by the user equipment in the foregoing embodiments. To avoid repetition, details are not described herein again.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

A user equipment is further provided in an embodiment of the present disclosure, including a processor 501, a memory 502, a computer program stored on the memory 502 and executable on the processor 501, the computer program is executed by the processor 501 to perform the method of indicating a system information type hereinabove, which can achieve the same technical effect, and to avoid repetition, details thereof will not be repeated here.

Figure 6:
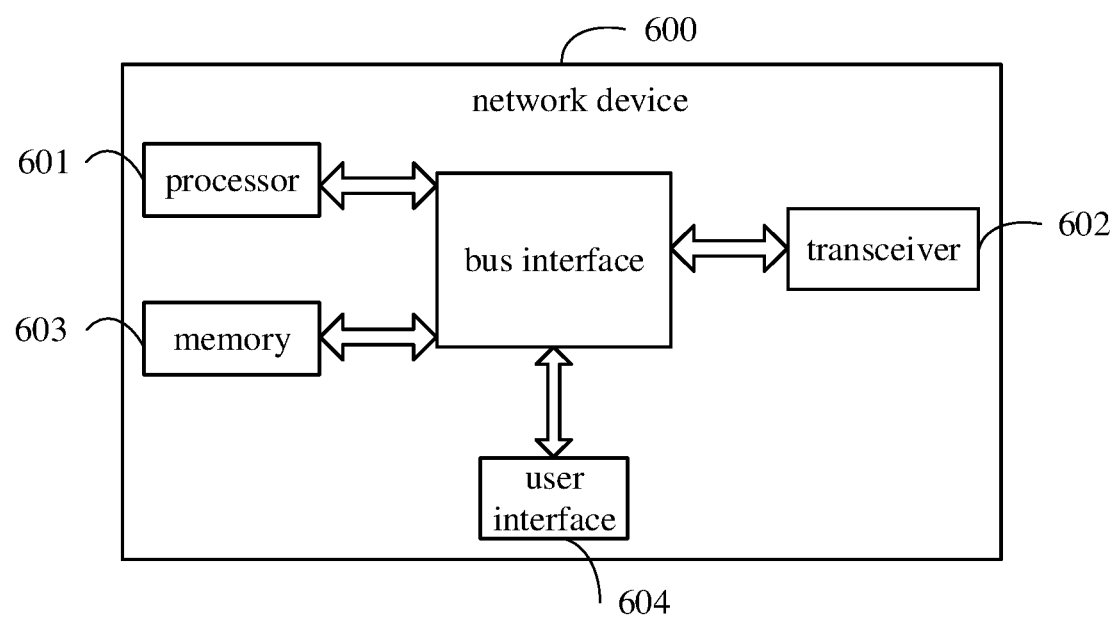
FIG. 6 is a structural diagram of a network device in another embodiment of the present disclosure.

Referring to FIG. 6 which is a structural diagram of a network device in another embodiment of the present disclosure, the network device 600 includes: a processor 601, a transceiver 602, a memory 603, a user interface 604, and a bus interface.

In the embodiment of the present disclosure, the network device 600 further includes: a computer program stored on the memory 603 and executable on the processor 601. The computer program is executed by the processor 601 to perform:

determining indication information configured to indicate a System Information (SI) type;

sending, to a user equipment, a Physical Downlink Control Channel (PDCCH) carrying the indication information.

In FIG. 6, the bus architecture may include any number of interconnected buses and bridges, specifically one or more processors represented by processor 601 and various circuits of the memory represented by memory 603 are linked together. The bus architecture can also link various other circuits such as peripheral devices, voltage regulators, and power management circuits, etc., which are well known in the art, and therefore, they will not be further described in this article. The bus interface provides an interface. The transceiver 602 may be a plurality of elements, including a transmitter and a receiver, and provides a unit for communicating with various other devices on a transmission medium. For different user equipment, the user interface 604 may also be an interface that can be externally connected to the required equipment. The connected equipment includes but is not limited to a keypad, a display, a speaker, a microphone, a joystick, and the like.

The processor 601 is responsible for managing the bus architecture and general processing, and the memory 603 may store data used by the processor 601 in performing operations.

According to the embodiment of the present disclosure, the SI type may be determined through the indication information. According to the SI type, it is able to determine which one of RMSI and OSI is the SI belonging to, or whether the SI is a SI message belonging to the OSI, thereby enabling the user equipment to determine which one of RMSI and OSI is the SI being at the physical layer, or which system information in OSI causes the ambiguity between RMSI and OSI and between OSI information.

Optionally, the computer program is executed by the processor 603 to perform:

determining, according to the SI type, a quantity of cyclic-shifted bits of a bit sequence relative to a System Information Radio Network Temporary Identity (SI-RNTI) sequence, where the bit sequence is used to scramble part or all of Cyclic Redundancy Check (CRC) bits in the PDCCH;

Optionally, the computer program is executed by the processor 603 to perform:

determining a CRC mask to scramble CRC bits scrambled by a SI-RNTI in the PDCCH, according to the SI type;

determining the CRC mask as the indication information.

Optionally, the computer program is executed by the processor 603 to perform:

determining a value of a Hybrid Automatic Repeat Request (HARQ) process number field in Downlink Control Information (DCI) in the PDCCH, according to the SI type;

determining the value of the HARQ process number field as the indication information.

Optionally, the computer program is executed by the processor 603 to perform:

determining a system information index corresponding to the SI type, according to the SI type;

determining the system information index as the indication information.

Optionally, the system information index is carried in DCI in the PDCCH.

Optionally, the system information index is carried in a reserved field or an unused field in the DCI.

A network device is further provided in an embodiment of the present disclosure, including a processor 601, a memory 603, and a computer program stored on the memory 603 and executable on the processor 601. The computer program is executed by the processor 601 to perform the method of indicating a system information type hereinabove, which can achieve the same technical effect, and to avoid repetition, details thereof will not be repeated here.

A computer-readable storage medium storing a computer program is further provided in an embodiment of the present disclosure. The computer program is executed by a processor to perform the method of indicating a system information type hereinabove, which can achieve the same technical effect, and to avoid repetition, details thereof will not be repeated here. The computer-readable storage medium may be a Read-Only Memory (ROM), Random Access Memory (RAM), magnetic disk or optical disk, etc.

It should be noted that in this article, the terms "including", "include" or any other variant thereof are intended to cover non-exclusive inclusion, so that a process, method, article or device that includes a series of elements includes not only those elements, It also includes other elements that are not explicitly listed, or include elements inherent to this process, method, article, or device. Without more restrictions, the element defined by the sentence "include one . . . " does not exclude that there are other identical elements in the process, method, article or device that includes the element.

Through the description of the above embodiments, those skilled in the art can clearly understand that the methods in the above embodiments can be implemented by means of software plus a necessary general hardware platform, and of course, can also be implemented by hardware, but in many cases the former is better Implementation. Based on this understanding, the technical solution of the present disclosure can be embodied in the form of a software product in essence or part that contributes to the existing technology, and the computer software product is stored in a storage medium (such as ROM/RAM, magnetic disk, The CD-ROM includes several instructions to enable a terminal (which may be a mobile phone, a computer, a server, an air conditioner, or a network device, etc.) to execute the method described in each embodiment of the present disclosure.

The embodiments of the present disclosure have been described above with reference to the drawings, but the present disclosure is not limited to the above-mentioned embodiments. The above-mentioned embodiments are only schematic instead of limiting the present disclosure. Based on the present disclosure, those of ordinary skill in the art may made many forms without departing from the principle of the present disclosure which shall fall within the scope of the present disclosure.

What is claimed is:

1. A method of indicating a system information type, applied to a network device, comprising:

determining indication information configured to indicate a System Information (SI) type comprising remaining minimum system information (RMSI) or other system information (OSI);

sending, to a user equipment, a Physical Downlink Control Channel (PDCCH), Downlink Control Information (DCI) in the PDCCH carrying the indication information.

2. The method according to claim 1, wherein the determining the indication information comprises:

determining, according to the SI type, a quantity of cyclic-shifted bits of a bit sequence relative to a System Information Radio Network Temporary Identity (SI-RNTI) sequence, wherein the bit sequence is used to scramble part or all of Cyclic Redundancy Check (CRC) bits in the PDCCH;

determining the quantity of cyclic-shifted bits as the indication information.

3. The method according to claim 1, wherein the determining the indication information comprises:

determining a CRC mask to scramble CRC bits scrambled by a SI-RNTI in the PDCCH, according to the SI type;

determining the CRC mask as the indication information.

4. The method according to claim 1, wherein the determining the indication information comprises:

determining a value of a Hybrid Automatic Repeat Request (HARQ) process number field in the DCI in the PDCCH, according to the SI type;

determining the value of the HARQ process number field as the indication information.

5. The method according to claim 1, wherein the determining the indication information comprises:

determining a system information index corresponding to the SI type, according to the SI type;

determining the system information index as the indication information.

6. The method according to claim 5, wherein the system information index is carried in the DCI in the PDCCH.

7. The method according to claim 6, wherein the system information index is carried in a reserved field or an unused field in the DCI.

8. A method of indicating a system information type, comprising:
  receiving a Physical Downlink Control Channel (PDCCH) sent by a network device, wherein Downlink Control Information (DCI) in the PDCCH carries indication information configured to indicate a System Information (SI) type comprising remaining minimum system information (RMSI) or other system information (OSI);
  determining the SI type according to the indication information.

9. The method according to claim 8, wherein the indication information is a quantity of cyclic-shifted bits of a bit sequence relative to a System Information Radio Network Temporary Identity (SI-RNTI) sequence, wherein the bit sequence is used to scramble part or all of Cyclic Redundancy Check (CRC) bits in the PDCCH;
  wherein the determining the SI type according to the indication information comprises:
  determining the SI type according to the quantity of cyclic-shifted bits and a correspondence between the SI type and the quantity of cyclic-shifted bits.

10. The method according to claim 8, wherein the indication information is a CRC mask to scramble CRC bits scrambled by a SI-RNTI in the PDCCH;
  wherein the determining the SI type according to the indication information comprises:
  determining the SI type according to the CRC mask and a correspondence between the CRC mask and the SI type.

11. The method according to claim 8, wherein the indication information is a value of a Hybrid Automatic Repeat Request (HARQ) process number field in the DCI in the PDCCH;
  wherein the determining the SI type according to the indication information comprises:
  determining the SI type according to the value of the HARQ process number field and a correspondence between the value of the HARQ process number field and the SI type.

12. The method according to claim 8, wherein the indication information is a system information index;
  wherein the determining the SI type according to the indication information comprises:
  determining a type indicated by the system information index as the SI type.

13. The method according to claim 12, wherein the system information index is carried in the DCI in the PDCCH.

14. A user equipment, comprising: a memory, a processor and a computer program stored in the memory and executable by the processor, wherein the computer program is executed by the processor to perform the method of indicating the system information type according to claim 8.

15. A network device, comprising: a memory, a processor and a computer program stored in the memory and executable by the processor, wherein the computer program is executed by the processor to:
  determine indication information configured to indicate a System Information (SI) type comprising remaining minimum system information (RMSI) or other system information (OSI);
  send, to a user equipment, a Physical Downlink Control Channel (PDCCH), Downlink Control Information (DCI) in the PDCCH carrying the indication information.

16. The network device according to claim 15, wherein the computer program is executed by the processor to:
  determine, according to the SI type, a quantity of cyclic-shifted bits of a bit sequence relative to a System Information Radio Network Temporary Identity (SI-RNTI) sequence, wherein the bit sequence is used to scramble part or all of Cyclic Redundancy Check (CRC) bits in the PDCCH;
  determine the quantity of cyclic-shifted bits as the indication information.

17. The network device according to claim 15, wherein the computer program is executed by the processor to:
  determine a CRC mask to scramble CRC bits scrambled by a SI-RNTI in the PDCCH, according to the SI type;
  determine the CRC mask as the indication information.

18. The network device according to claim 15, wherein the computer program is executed by the processor to:
  determine a value of a Hybrid Automatic Repeat Request (HARQ) process number field in the DCI in the PDCCH, according to the SI type;
  determine the value of the HARQ process number field as the indication information.

19. The network device according to claim 15, wherein the computer program is executed by the processor to:
  determine a system information index corresponding to the SI type, according to the SI type;
  determine the system information index as the indication information.

20. The network device according to claim 19, wherein the system information index is carried in the DCI in the PDCCH.

* * * * *